(12) United States Patent
Hashimoto (10) Patent No.: US 11,526,263 B2
(45) Date of Patent: Dec. 13, 2022

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Ryoko Hashimoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/141,188

(22) Filed: Jan. 4, 2021

(65) Prior Publication Data

US 2021/0382608 A1    Dec. 9, 2021

(30) Foreign Application Priority Data

Jun. 9, 2020    (JP) .............................. JP2020-100290

(51) Int. Cl.
| | |
|---|---|
| *G06F 3/0484* | (2022.01) |
| *G06F 3/04842* | (2022.01) |
| *G06F 3/0481* | (2022.01) |
| *G06F 9/451* | (2018.01) |
| *H04L 9/40* | (2022.01) |

(52) U.S. Cl.
CPC ........ *G06F 3/04842* (2013.01); *G06F 3/0481* (2013.01); *G06F 9/451* (2018.02); *H04L 63/083* (2013.01); *H04L 63/102* (2013.01)

(58) Field of Classification Search
CPC .......... G06F 21/55; G06F 21/52; G06F 21/44; G06F 2221/2149; G06F 2212/171; G06F 3/1237; G06F 3/1286; G06F 3/04842; G06F 3/04812; G06F 9/451; H04N 1/00477; H04L 63/10; H04L 63/102; H04L 63/083
See application file for complete search history.

(56) References Cited

U.S. PATENT DOCUMENTS

| | | | |
|---|---|---|---|
| 10,437,988 B1 * | 10/2019 | Newstadt | ................ G06F 21/84 |
| 10,785,200 B2 | 9/2020 | Takahashi | |
| 10,873,588 B2 * | 12/2020 | Woodworth, Jr. | ...... H04L 51/12 |
| 2005/0097171 A1 * | 5/2005 | Hikichi | ............... H04L 63/0407 |
| | | | 709/204 |
| 2006/0101341 A1 * | 5/2006 | Kelly | .................. G06F 3/04812 |
| | | | 715/738 |
| 2007/0150299 A1 * | 6/2007 | Flory | ..................... H04L 63/20 |
| | | | 705/344 |

(Continued)

FOREIGN PATENT DOCUMENTS

| | | | | |
|---|---|---|---|---|
| AU | 2013251304 A1 * | 11/2014 | ............. | G06F 16/93 |
| AU | 2014236602 | * 3/2015 | ............. | H04L 63/08 |

(Continued)

*Primary Examiner* — Steven P Sax
(74) *Attorney, Agent, or Firm* — JCIPRNET (57) ABSTRACT

An information processing apparatus includes a processor configured to make a transition from a provided screen, which is provided by a second service that cooperates with a first service that is being executed, to a first screen in a case where a first screen constituent element for receiving an instruction to display the first screen is selected on the provided screen, and not to display a second screen in a case where a second screen constituent element for receiving an instruction to display the second screen is selected on the provided screen.

5 Claims, 6 Drawing Sheets

(56) References Cited

U.S. PATENT DOCUMENTS

| | | | | |
|---|---|---|---|---|
| 2007/0203776 | A1* | 8/2007 | Austin | G06Q 10/00 705/321 |
| 2007/0289022 | A1* | 12/2007 | Wittkotter | H04L 63/123 726/26 |
| 2011/0022662 | A1* | 1/2011 | Barber-Mingo | G06Q 10/06 709/206 |
| 2012/0192277 | A1* | 7/2012 | Jakobsson | G06F 21/83 726/24 |
| 2013/0055386 | A1* | 2/2013 | Kim | H04L 63/1483 726/22 |
| 2013/0254111 | A1* | 9/2013 | Gonser | G06Q 20/02 705/44 |
| 2016/0162697 | A1* | 6/2016 | Follis | G06F 21/6209 726/28 |
| 2017/0205878 | A1* | 7/2017 | Hoste | G06F 3/0227 |
| 2019/0020664 | A1* | 1/2019 | Wood | H04L 63/145 |
| 2020/0167798 | A1* | 5/2020 | Lee | G06Q 30/016 |
| 2020/0213469 | A1* | 7/2020 | Nakatani | H04N 1/32587 |
| 2020/0394004 | A1* | 12/2020 | Balasubramanian | G06F 3/1285 |
| 2020/0401718 | A1* | 12/2020 | Hennig | G06F 21/6281 |
| 2021/0243184 | A1* | 8/2021 | La Torre | H04L 63/083 |
| 2021/0319517 | A1* | 10/2021 | Aringdale | G06F 3/0482 |
| 2022/0038291 | A1* | 2/2022 | Hong | G06F 21/32 |

FOREIGN PATENT DOCUMENTS

| | | | | |
|---|---|---|---|---|
| AU | 2014363926 | * | 8/2015 | H04L 63/0428 |
| CA | 3062272 A1 | * | 10/2018 | H04L 45/24 |
| CA | 3038506 A1 | * | 10/2020 | |
| CN | 110232568 A | * | 9/2019 | |
| JP | 2014-038608 | | 2/2014 | |
| JP | 2018092564 | | 6/2018 | |
| JP | 2020517034 | * | 6/2020 | |

* cited by examiner

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-100290 filed Jun. 9, 2020.

BACKGROUND

(i) Technical Field

The present disclosure relates to an information processing apparatus and a non-transitory computer readable medium.

(ii) Related Art

Japanese Unexamined Patent Application Publication No. 2014-38608 describes an application log-in system including: a user terminal in which a first application and a second application are installed, and which performs log-in processing to the first application; and a service server which receives a token of the first application, a signature of the first application, a consumer key of the second application, and a signature of the second application from the user terminal, and performs log-in processing to the second application using user information identified from the received token of the first application.

Japanese Unexamined Patent Application Publication No. 2018-92564 describes an information processing system including a cloud server and an information processing terminal, the cloud server including: a cloud app storage unit that stores a program for using a cloud service; an account information storage unit that stores account information of a cloud account registered in the cloud service; and an authentication management unit that manages execution of authentication processing for the cloud service, and the information processing terminal including: an app information acquisition unit that acquires a program from the cloud server; a sign-up unit that requests the cloud server to sign up to the cloud service by using an external account of an external service; a passcode setting unit that requests the cloud server to set a passcode or a character string for signing in to the cloud service; and a sign-in unit that requests the cloud server to sign in to the cloud service by using the cloud account.

SUMMARY

In order to use a function of a different service using application software that cooperates with the different service, it is necessary to log in to the service. It is occasionally requested to use a screen for user authentication provided by the service, as it is, to log in.

There may be a link prepared to allow use of a function other than the user authentication on the screen provided by the different service, and such a function may not match the purpose of the application software.

Aspects of non-limiting embodiments of the present disclosure relate to providing an information processing apparatus and a non-transitory computer readable medium that allow execution of only a part of functions provided by a different cooperating service in the case where a screen provided by the different service is displayed to allow execution of a function of the different service.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to make a transition from a provided screen, which is provided by a second service that cooperates with a first service that is being executed, to a first screen in a case where a first screen constituent element for receiving an instruction to display the first screen is selected on the provided screen, and not to display a second screen in a case where a second screen constituent element for receiving an instruction to display the second screen is selected on the provided screen.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will be described below with reference to the drawings. In the drawings, identical or equivalent constituent elements and portions are denoted by the same reference numerals. The drawings may not be to scale, and may be depicted in an exaggerated manner for convenience of illustration.

Figure 1:
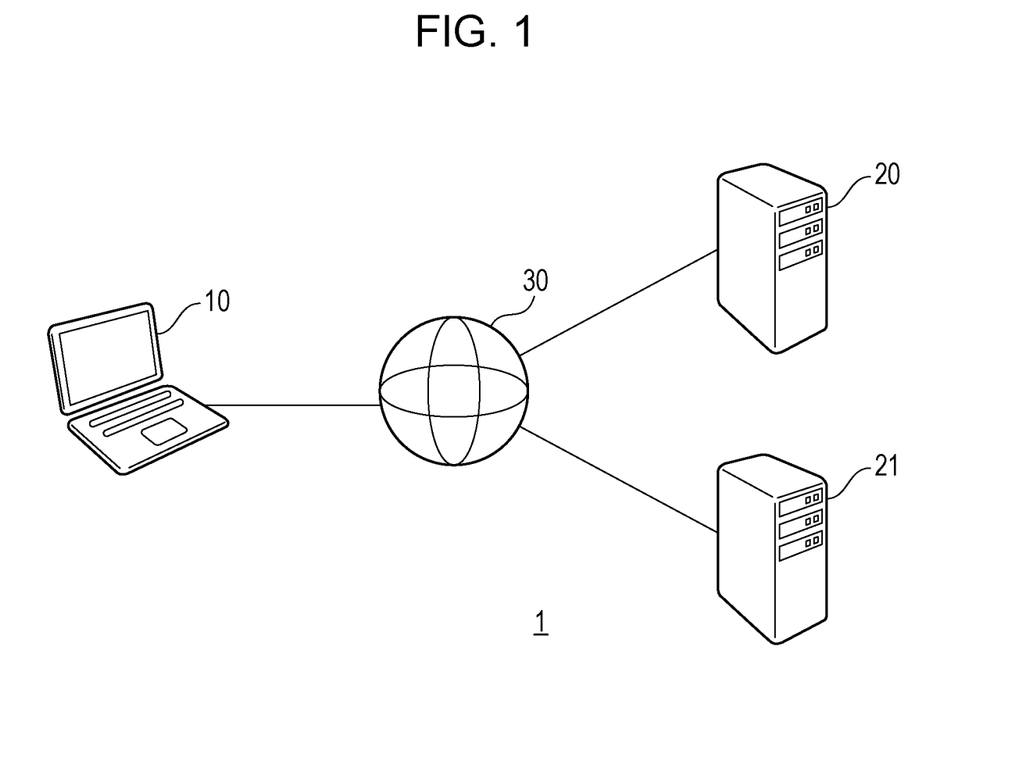
FIG. 1 illustrates a schematic configuration of an information processing system according to the present exemplary embodiment.

FIG. 1 illustrates a schematic configuration of an information processing system according to the present exemplary embodiment.

An information processing system 1 illustrated in FIG. 1 includes an information processing apparatus 10 and servers 20 and 21. The information processing apparatus 10 and the servers 20 and 21 are communicably connected to each other via a network 30 such as the Internet.

The information processing apparatus 10 is a device that is used by a user, and may be a personal computer, for example. In the present exemplary embodiment, the information processing apparatus 10 executes document management software as a first service. The document management software has a function of invoking and executing a second service to be executed by the server 20. In the present exemplary embodiment, the second service is an electronic signature service for applying an electronic signature to document data managed by the document management software. However, the second service may be any service to be invoked during use of the first service, and may be a service for saving data, a service for processing an image, etc., for example.

In the present exemplary embodiment, the server 20 provides a service to be executed on the Internet called "cloud service" as the second service which is different from the first service discussed above. In the present exemplary embodiment, the service executed by the server 20 is an electronic signature service for applying an electronic signature to document data as discussed above.

The server 21 is a server that provides a service that is different from the first service and the second service discussed above. The server 21 provides a social networking service (SNS), for example, as the service that is different from the first service and the second service.

In some cases, the electronic signature service executed by the server 20 allows a user to use the scheme of user authentication for the SNS provided by the server 21. The user may be authenticated for the electronic signature service, even if the user is not registered for the electronic signature service, by using the scheme of user authentication for the SNS provided by the server 21. In the case where the document management software does not support user authentication for the SNS as user authentication for the electronic signature service, however, the document management software may not be able to provide an expected function to the user if a transition is made to a screen provided by the SNS when a screen for logging in to the electronic signature service from the document management software is displayed.

Figure 2:
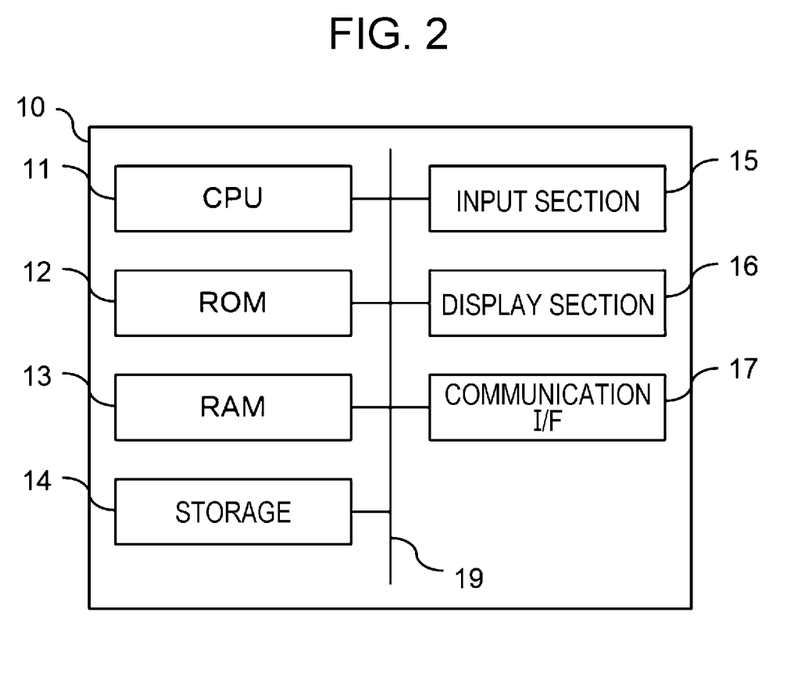
FIG. 2 is a block diagram illustrating the hardware configuration of an information processing apparatus.

FIG. 2 is a block diagram illustrating the hardware configuration of the information processing apparatus 10.

As illustrated in FIG. 2, the information processing apparatus 10 includes a central processing unit (CPU) 11, a read only memory (ROM) 12, a random access memory (RAM) 13, a storage 14, an input section 15, a display section 16, and a communication interface (I/F) 17. The various components are communicably connected to each other via a bus 19.

The CPU 11 is a central processing unit, and executes various programs and controls various sections. That is, the CPU 11 reads programs from the ROM 12 or the storage 14, and executes the programs using the RAM 13 as a work area. The CPU 11 controls the various components described above and performs various computation processes in accordance with the programs stored in the ROM 12 or the storage 14. In the present exemplary embodiment, the ROM 12 or the storage 14 stores a computer program for the document management software for reliably providing an expected function of the document management software to the user.

The ROM 12 stores various programs and various data. The RAM 13 serves as a work area to temporarily store the programs and the data. The storage 14 is constituted as a storage device such as a hard disk drive (HDD) or a solid state drive (SSD), and stores various programs including an operating system and various data.

The input section 15 includes a pointing device such as a mouse and a keyboard, and is used to allow various inputs.

The display section 16 may be a liquid crystal display, for example, and displays various types of information. The display section 16 may adopt a touch screen to also function as the input section 15.

The communication interface 17 is an interface for communication with a difference device such as the server 20, etc., and uses a standard such as Ethernet (registered trademark), fiber-optic data distribution interface (FDDI), and Wi-Fi (registered trademark), for example.

To execute the program for the document management software described above, the information processing apparatus 10 implements various functions using the hardware resources described above. The functional configuration implemented by the information processing apparatus 10 will be described.

Figure 3:
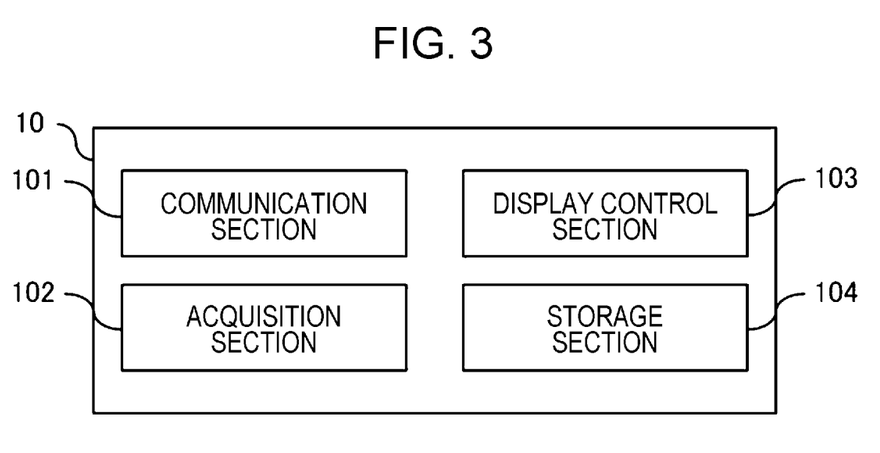
FIG. 3 is a block diagram illustrating an example of the functional configuration of the information processing apparatus.

FIG. 3 is a block diagram illustrating an example the functional configuration of the information processing apparatus 10.

As illustrated in FIG. 3, the information processing apparatus 10 includes, as functional components, a communication section 101, an acquisition section 102, a display control section 103, and a storage section 104. The functional components are implemented by the CPU 11 reading and executing a computer program stored in the ROM 12 or the storage 14.

The communication section 101 communicates with a different device such as the server 20 to execute data transmission and reception. For example, the communication section 101 transmits document data managed by the document management software to the electronic signature service executed by the server 20. The communication section 101 also receives document data to which an electronic signature has been applied by the electronic signature service from the server 20, for example.

The acquisition section 102 acquires information received by the communication section 101 or information stored in the storage section 104. Examples of the information acquired by the acquisition section 102 include a designated address designated by the document management software when the document management software is executed and user authentication is performed for the electronic signature service from the document management software.

The display control section 103 controls display for the document management software executed by the information processing apparatus 10. In the present exemplary embodiment, the display control section 103 makes a transition from a provided screen, which is provided by the electronic signature service, to a first screen in the case where a first screen constituent element for receiving an instruction to display the first screen is selected on the provided screen. Examples of the provided screen provided by the electronic signature service include a log-in screen for the electronic signature service. The first screen constituent element may be a button for logging in to the electronic signature service, for example. The first screen may be a screen for applying an electronic signature to document data through the electronic signature service, for example. That is, the first screen may be a screen provided by the second service and used while the user is using the first service.

On the other hand, the display control section 103 does not display a second screen, which is different from the first screen, in the case where a second screen constituent element for receiving an instruction to display the second screen is selected on the provided screen. The second screen constituent element may be a button for logging in to the SNS provided by the server 21, for example. The second screen may be a log-in screen for the SNS provided by the server 21, for example. Alternatively, the second screen constituent element may be a link for trial use of the electronic signature service provided by the server 20, for example. The second screen may be a screen for trial use of the electronic signature service, for example. Alternatively, the second screen constituent element may be a link for registering an account for the electronic signature service provided by the server 20, for example. The second screen may be a screen for registering an account for the electronic signature service, for example. That is, the second screen is a screen for a function provided by the second service that is not supported by the first service or not expected to be used by the user in the first service.

For example, the display control section 103 references information on the designated address acquired by the acquisition section 102 when the electronic signature service is invoked from the document management software and the provided screen provided by the electronic signature service is displayed. The display control section 103 permits a transition to an address that is identical to the designated address in the case where a transition to the identical address is to be made, and prohibits a transition to an address that is different from the designated address when a transition to the different address is to be made.

The storage section 104 stores data to be used by the document management software executed by the information processing apparatus 10. For example, the storage section 104 stores document data managed by the document management software and information on the designated address discussed above.

Next, the function of the information processing apparatus 10 will be described.

Figure 4:
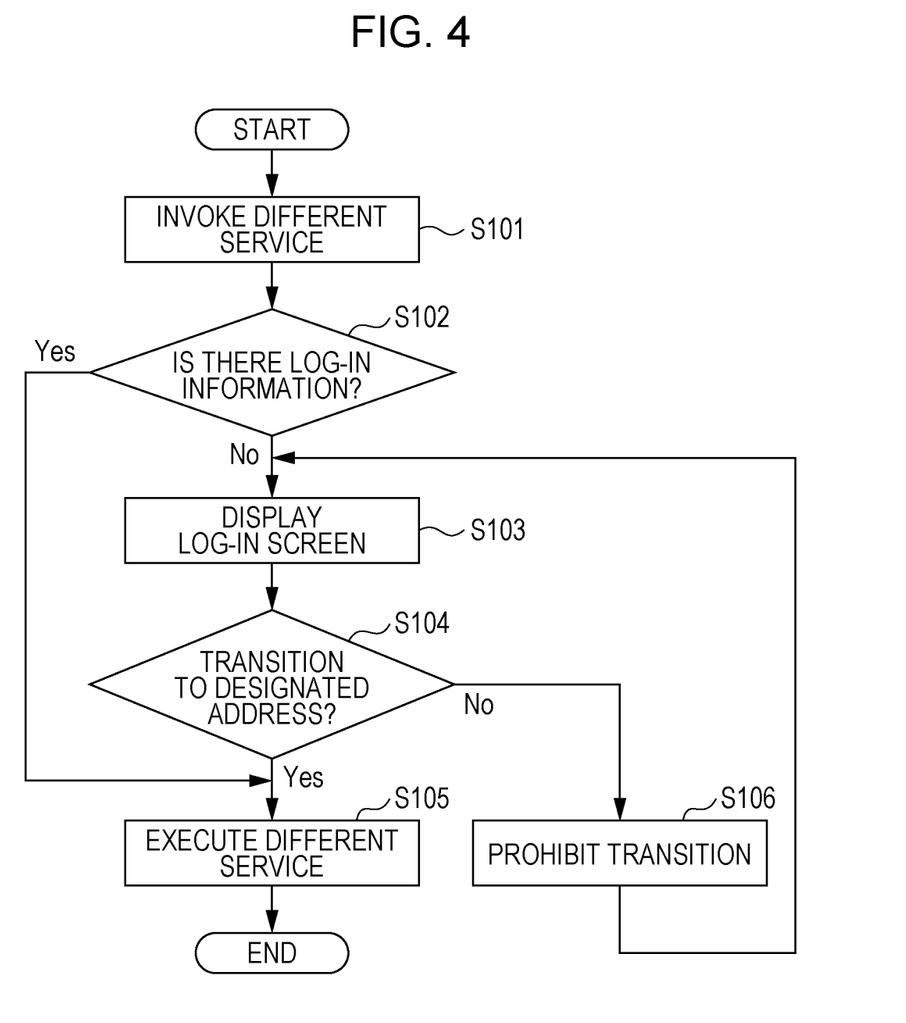
FIG. 4 is a flowchart illustrating the function of the information processing apparatus.

FIG. 4 is a flowchart illustrating the flow of a display control process of the document management software performed by the information processing apparatus 10. The display control process of the document management software is performed by the CPU 11 reading a computer program from the ROM 12 or the storage 14, developing the computer program in the RAM 13, and executing the computer program.

The CPU 11 invokes a different service on the basis of an operation by the user during execution of the document management software (step S101). For example, the CPU 11 invokes the electronic signature service for applying an electronic signature to document data managed by the document management software on the basis of an operation by the user.

The CPU 11 may activate cooperative software for using a different service, which is called "plug-in" or "add-in", to invoke the service. The CPU 11 may exchange document data between the document management software and the different service via the cooperative software.

Subsequent to step S101, the CPU 11 determines whether or not there is log-in information for the different service invoked in step S101 (step S102). The CPU 11 may determine whether or not there is log-in information for the different service in accordance with whether the log-in information is held in the storage 14, for example. The log-in information may be a user identification (ID) and a password, a token issued by the service, etc., for example.

If there is no log-in information for the different service (step S102: No) as a result of the determination in step S102, the CPU 11 performs display control for displaying a log-in screen for the invoked different service (step S103). Specifically, the CPU 11 performs display control for displaying a log-in screen for the different service by executing a web browser integrated in the document management software and accessing the log-in screen using the web browser. If there is log-in information for the different service (step S102: Yes) as a result of the determination in step S102, on the other hand, the process proceeds to step S105.

Subsequent to step S103, the CPU 11 determines whether or not a transition is made to the designated address in accordance with an operation performed by the user on the log-in screen (step S104).

In the case where a transition to the designated address is made (step S104: Yes) as a result of the determination in step S104, the CPU 11 permits a transition to the address so that the different service invoked in step S101 is executed on the information processing apparatus 10 (step S105).

In the case where a transition to the designated address is not made (step S104: No) as a result of the determination in step S104, on the other hand, the CPU 11 prohibits a transition to the address (step S106). The CPU 11 may display a predetermined error message when a transition to the address is prohibited in step S106. After prohibiting a transition to the address in step S106, the CPU 11 returns to the display of the log-in screen in step S103.

Operation of the information processing apparatus 10 according to the present exemplary embodiment will be described using a specific example.

Figure 5:
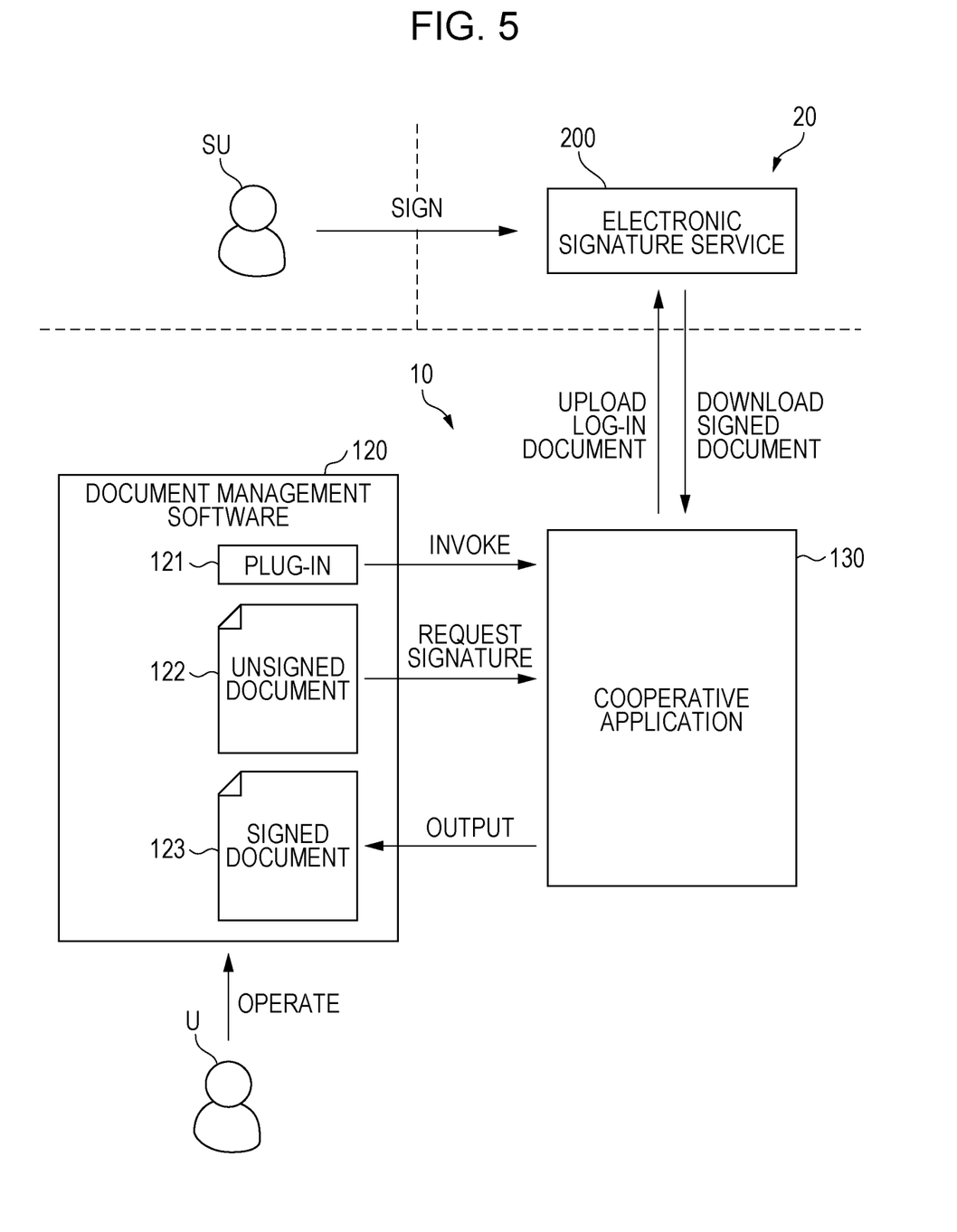
FIG. 5 illustrates a specific example of the information processing system.

FIG. 5 illustrates a specific example of the information processing system 1. In the information processing apparatus 10, document management software 120 is executed by the CPU 11. The server 20 provides an electronic signature service 200 for applying an electronic signature to document data. The document management software 120 includes an integrated plug-in 121 for invoking a cooperative application 130 that cooperates with the electronic signature service 200. The cooperative application 130 is an application for cooperation between the document management software 120 and the electronic signature service 200.

A user U of the information processing apparatus 10 operates the document management software 120 to invoke the cooperative application 130, and asks the cooperative application 130 to apply an electronic signature to an unsigned document 122 managed by the document management software 120. The cooperative application 130 logs in to the electronic signature service 200, and uploads the unsigned document 122 to the server 20 through the network 30.

An electronic signature is applied by a signer SU to the unsigned document 122 uploaded to the server 20. The user U may download signed document data to which an electronic signature has been applied from the server 20. The cooperative application 130 outputs the signed document data downloaded from the server 20 to the document management software 120. The user U may confirm signed document data 123 sent from the cooperative application 130 to confirm whether or not an electronic signature has been applied. The user U and the signer SU may be an identical user.

Figure 6:
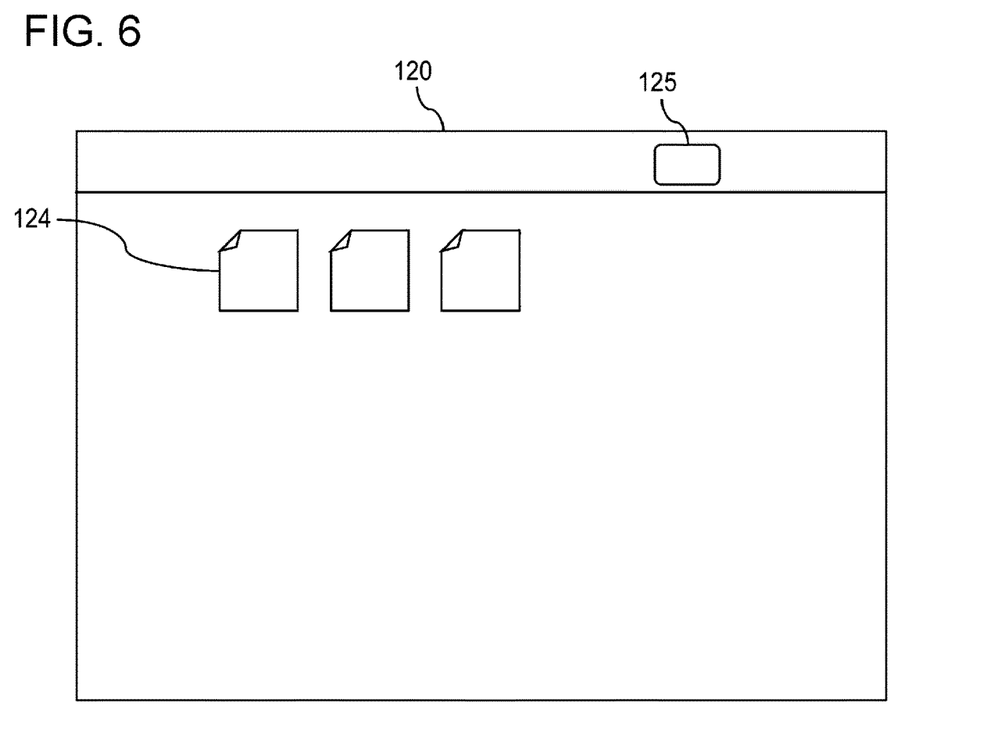
FIG. 6 illustrates an example of a user interface of document management software.

FIG. 6 illustrates an example of a user interface of the document management software 120. The user interface illustrated in FIG. 6 includes an icon 125 for invoking an electronic signature service to apply an electronic signature to document data 124. When the user U selects the icon 125 with the document data 124 that he/she desires to be electronically signed selected, the document management software 120 activates the cooperative application 130. The cooperative application 130 executes a process of logging in to the electronic signature service 200.

Figure 7:
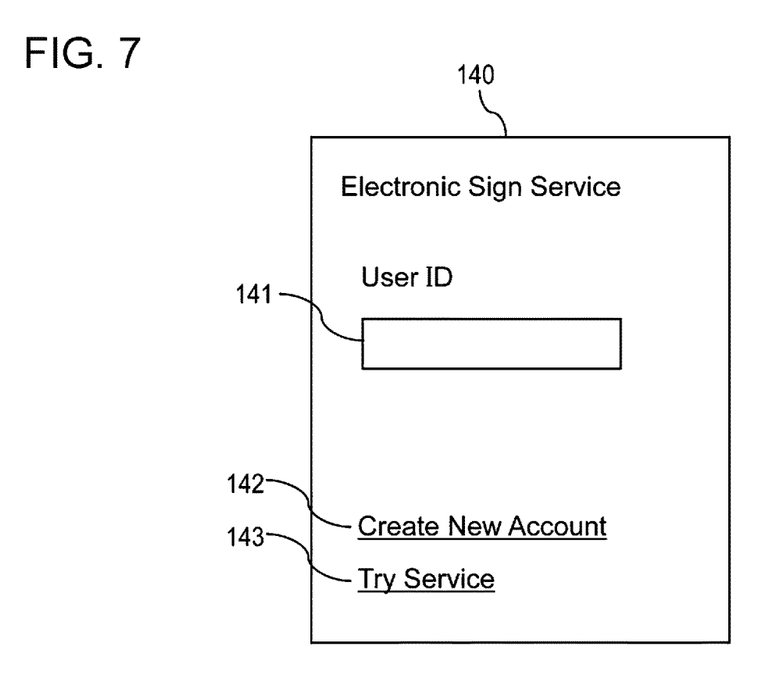
FIG. 7 illustrates an example of a log-in screen to an electronic signature service.

FIG. 7 illustrates an example of a log-in screen to the electronic signature service 200. A log-in screen 140 illustrated in FIG. 7 is displayed on the information processing apparatus 10 in the case where the user U selects the icon 125 illustrated in FIG. 6. The log-in screen 140 illustrated in FIG. 7 includes a user ID input field 141, a link 142 to an account preparation screen for the electronic signature service, and a link 143 to a screen for trial use of the electronic signature service.

When the user U inputs a user ID to the user ID input field 141, the CPU 11 makes a transition to a password input screen to be discussed later. When the user U selects the link 142 in the case where the log-in screen 140 is invoked from the document management software 120, meanwhile, the CPU 11 prohibits a transition to an account creation screen for the electronic signature service. Similarly, when the user U selects the link 143 in the case where the log-in screen 140 is invoked from the document management software 120, the CPU 11 prohibits a transition to a screen for trial use of the electronic signature service.

The CPU 11 may hide characters or buttons for the links 142 and 143 by displaying a rectangle in a thin color such as gray as superposed thereon in the case where the log-in screen 140 is invoked from the document management software 120. Alternatively, the CPU 11 may set the size of the log-in screen 140 such that the links 142 and 143 are not displayed in the case where the log-in screen 140 is invoked from the document management software 120. The CPU 11 may make the size of the log-in screen 140 unchangeable, or make the screen unscrollable, in the case where the size of the log-in screen 140 is set such that the links 142 and 143 are not displayed.

Figure 8:
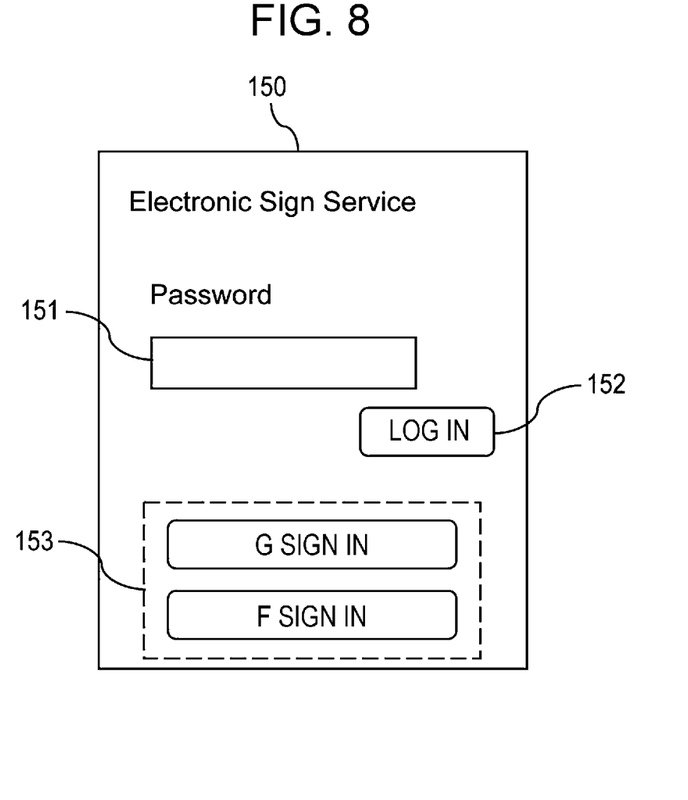
FIG. 8 illustrates an example of a log-in screen to the electronic signature service.

FIG. 8 illustrates an example of the log-in screen to the electronic signature service. A log-in screen 150 illustrated in FIG. 8 is a screen for password input to be displayed after a correct user ID is input to the log-in screen 140. The log-in screen 150 includes a password input field 151, a log-in button 152, and SNS sign-in buttons 153.

When the user U inputs a password to the password input field 151 and selects the log-in button 152, a process of logging in to the electronic signature service is performed on the server 20 using the user ID input to the user ID input field 141 and the password input to the password input field 151.

When the user U selects the SNS sign-in button 153 in the case where the log-in screen 140 is invoked from the document management software 120 and a transition is made to the log-in screen 150, on the other hand, the CPU 11 prohibits a transition to an SNS sign-in screen.

The CPU 11 may hide the sign-in button 153 by displaying a rectangle in a thin color such as gray as superposed thereon in the case where the log-in screen 140 is invoked from the document management software 120 and a transition is made to the log-in screen 150. Alternatively, the CPU 11 may set the size of the log-in screen 150 such that the SNS sign-in button 153 is not displayed in the case where the log-in screen 140 is invoked from the document management software 120 and a transition is made to the log-in screen 150. The CPU 11 may make the size of the log-in screen 150 unchangeable, or make the screen unscrollable, in the case where the size of the log-in screen 150 is set such that the SNS sign-in button is not displayed.

Figure 9:
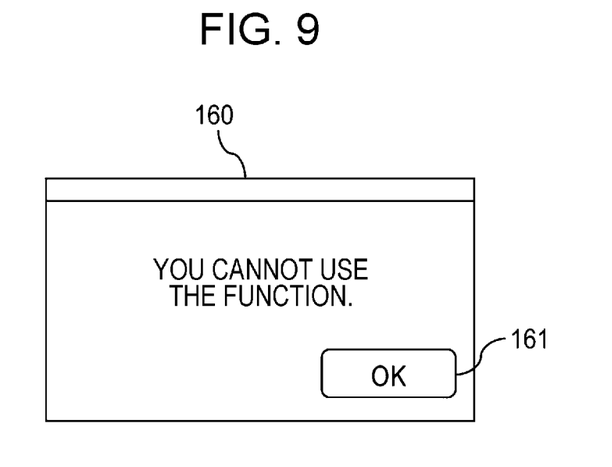
FIG. 9 illustrates an example of a message displayed by the document management software.

FIG. 9 illustrates an example of a message displayed by the document management software 120. A message 160 illustrated in FIG. 9 is an example of a message to be displayed by the document management software 120 in the case where the log-in screen 140 is invoked from the document management software 120 and when a transition to a screen, a transition to which is not permitted by the document management software 120, is attempted. Examples of the screen, a transition to which is not permitted by the document management software 120, include an account creation screen for the electronic signature service and an SNS sign-in screen.

In the case where a transition to a screen, a transition to which is not permitted by the document management software 120 because of a mismatch with the designated address etc., is attempted, the CPU 11 displays the message 160 saying that the function may not be used as illustrated in FIG. 9. A button 161 is a button for returning to the original screen (log-in screen 140 or log-in screen 150) upon being selected by the user U.

The display control process, software (program) for which is read and executed by the CPU in the exemplary embodiment described above, may be executed by various processors other than the CPU. In this case, the processor may be a programmable logic device (PLD) with circuitry that is changeable after manufacture such as a field-programmable gate array (FPGA), a dedicated electric circuit which is a processor having circuitry exclusively designed to execute a specific process such as an application specific integrated circuit (ASIC), etc. The display control process may be executed by one of such various processors, or may be executed by a combination of two or more processors of the same type or different types (e.g. a plurality of FPGA, a combination of a CPU and an FPGA, etc.). The hardware structure of the various processors is more specifically an electric circuit in which circuit elements such as semiconductor elements are combined.

In the embodiment described above, the program for the display control process is stored (installed) in advance in the ROM or the storage. However, the present disclosure is not limited thereto. The program may be provided as recorded in a non-transitory storage medium such as a compact disk read only memory (CD-ROM), a digital versatile disk read only memory (DVD-ROM), and a universal serial bus (USB) memory. Alternatively, the program may be downloaded from an external device via a network.

In the embodiment above, the term "processor" is broad enough to encompass one processor or plural processors in collaboration which are located physically apart from each other but may work cooperatively. The order of operations of the processor is not limited to one described in the embodiment above, and may be changed.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a display; and a processor configured to:
  execute a document management application having a first user interface on the display, wherein the first user interface includes a plurality of documents and an icon;
  invoke an electronic signature application based on a selection of a plurality of the documents and an operation performed on the icon within the document management application displayed in the first user interface, wherein the invoking of the electronic signature application further automatically invoke a separate plugin application which authenticates the document management application to use the electronic signature application and manages communications between the document management application and the electronic signature application;
  display a second user interface for logging into the electronic signature application through the separate plugin application in response to the invocation of the electronic signature application and subsequent to the invocation of the separate plugin application, wherein the second user interface includes a first link and a second link, wherein the first link having a first address connecting to a first server executing the electronic signature application via a first authentication method, and the second link having a second address connecting to a second server that executes a second authentication method for using the electronic signature application executed by the first server, and wherein the first server is different from the second server, and the first authentication method is different from the second authentication method;
  determine the document management application supports the first authentication method provided by the first server and does not support the second authentication method provided by the second server;
  prohibit the second authentication method provided by the second server in response to an operation performed on the second link and the determination of the second authentication method not being supported by the document management application, wherein in response to the user clicking on the second link, graying out the link and displaying a message explaining that the second authentication method provided by the second link is not being supported by the document management application; and
  transition from the second user interface to a third user interface which is provided by the electronic signature application in response to a successful login through the authentication method provided by a selection of the first link,
  wherein in response to the successful login through the first link, the processor is further configured to:
  transmit, through the separate plugin application, the selected document from the document management application to the electronic signature application,
  confirm an electronic signature being applied to the selected document,
  receive, through the separate plugin application, signed documents resulting from the electronic signature being applied to the selected document, and
  display the signed documents in the third user interface.

2. The information processing apparatus according to claim 1,
  wherein the the second interface is a log-in screen for logging in to the electronic signature application.

3. The information processing apparatus according to claim 1,
  wherein the second authentication method is for registering an account for the electronic signature application, or an authentication method provided by a third service that does not cooperate with the document management application.

4. The information processing apparatus according to claim 1,
  wherein the processor is further configured to hide second link in the second user interface when determined that the document management application does not support the authentication method designated by the second link.

5. A non-transitory computer readable medium storing a computer program causing a computer to execute a process comprising:
  executing a document management application having a first user interface on the display, wherein the first user interface includes a plurality of documents and an icon;
  invoking an electronic signature application based on a selection of a plurality of the documents and an operation performed on the icon within the document management application displayed in the first user interface, wherein the invoking of the electronic signature application further automatically invoke a separate plugin application which authenticates the document management application to use the electronic signature application and manages communications between the document management application and the electronic signature application;
  displaying a second user interface for logging into the electronic signature application through the separate plugin application in response to the invocation of the electronic signature application and subsequent to the invocation of the separate plugin application, wherein the second user interface includes a first link and a second link, wherein the first link having a first address connecting to a first server executing the electronic signature application via a first authentication method, and the second link having a second address connecting to a second server that executes a second authentication method for using the electronic signature application executed by the first server, and wherein the first server is different from the second server, and the first authentication method is different from the second authentication method;
  determining the document management application supports the first authentication method provided by the first server and does not support the second authentication method provided by the second sever;
  prohibiting second authentication method provided by the second server in response to an operation performed on the second link and the determination of the second authentication method not being supported by the document management application, wherein in response to the user clicking on the second link, graying out the link and displaying a message explaining that the second authentication method provided by the second link is not being supported by the document management application; and
  transitioning from the second user interface to a third user interface which is provided by the electronic signature application in response to a successful login through the authentication method provided by a selection of the first link, wherein in response to the successful login through the first link, the processor is further configured to:

transmitting, through the separate plugin application, the selected documents from the document management application to the electronic signature application, confirming an electronic signature being applied to the selected documents, receiving, through the separate plugin application, signed documents resulting from the electronic signature being applied to the selected documents, and displaying the signed documents in the third user interface.

\* \* \* \* \*